US012790187B2

(12) United States Patent
Weiss

(10) Patent No.: US 12,790,187 B2
(45) **Date of Patent: *Nov. 10, 2026**

(54) VEHICLE-TO-VEHICLE COMMUNICATION FOR TRAJECTORY AWARENESS OF A MATERIAL HANDLING VEHICLE

(71) Applicant: The Raymond Corporation, Greene, NY (US)

(72) Inventor: Joseph A. Weiss, Greene, NY (US)

(73) Assignee: The Raymond Corporation, Greene, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/958,891

(22) Filed: Nov. 25, 2024

(65) Prior Publication Data

US 2025/0091845 A1 Mar. 20, 2025

Related U.S. Application Data

(63) Continuation of application No. 17/831,223, filed on Jun. 2, 2022, now Pat. No. 12,168,598.
(Continued)

(51) Int. Cl.
*B66F 9/06* (2006.01)
*B66F 9/075* (2006.01)
(Continued)

(52) U.S. Cl.
CPC ............ *B66F 9/063* (2013.01); *B66F 9/0755* (2013.01); *G05D 1/0289* (2013.01);
(Continued)

(58) Field of Classification Search
CPC .......... B66F 9/063; B66F 9/0755; B66F 9/24; G05D 1/0289; G05D 1/0291; G05D 1/69;
(Continued)

(56) References Cited

U.S. PATENT DOCUMENTS 5,213,383 A * 5/1993 Muselli .................... B25J 5/007
293/154
5,890,562 A 4/1999 Bartels et al.
(Continued)

FOREIGN PATENT DOCUMENTS

| | | | |
|---|---|---|---|
| CN | 105894856 | A | 8/2016 |
| EP | 3035074 | A1 | 6/2016 |
| WO | 2015137991 | A1 | 9/2015 |

OTHER PUBLICATIONS

European Patent Office, Extended Search Report, Application No. 22177048.0, Nov. 7, 2022, 7 pages.

*Primary Examiner* — Tyler D Paige
(74) *Attorney, Agent, or Firm* — Quarles & Brady LLP

(57) ABSTRACT

Systems and methods provide assistance to an operator of a material handling vehicle. Provided systems and methods include receiving vehicle condition data at a first material handling vehicle from a second material handling vehicle when the second material handling vehicle is within a predetermined communication range, determining a first predicted vehicle position for the first material handling vehicle based on current vehicle conditions, determining a second predicted vehicle position for the second material handling vehicle based on the received vehicle condition data, and determining if the first predicted vehicle position for the first material handling vehicle overlaps with the second predicted vehicle position for the second material handling vehicle. Upon the determination that the first predicted vehicle position overlaps with the second predicted vehicle position, the operator of the first material handling vehicle is provided an indication.

20 Claims, 16 Drawing Sheets

Related U.S. Application Data

(60) Provisional application No. 63/196,526, filed on Jun. 3, 2021.

(51) Int. Cl.

| | |
|---|---|
| ***G05D 1/00*** | (2024.01) |
| ***G05D 1/69*** | (2024.01) |
| ***G05D 1/693*** | (2024.01) |
| ***H04W 4/029*** | (2018.01) |
| ***H04W 4/46*** | (2018.01) |

(52) U.S. Cl.

CPC ............. *G05D 1/0291* (2013.01); *G05D 1/69* (2024.01); *G05D 1/693* (2024.01); *H04W 4/46* (2018.02)

(58) Field of Classification Search

CPC ........ G05D 1/693; H04W 4/46; H04W 4/029; H04W 4/027; H04B 1/3822

USPC ............................................................ 701/50

See application file for complete search history.

(56) References Cited

U.S. PATENT DOCUMENTS

| | | | | |
|---|---|---|---|---|
| 7,124,027 | B1 | 10/2006 | Ernst, Jr. et al. | |
| 7,656,271 | B2 * | 2/2010 | Ehrman | G06Q 20/382 701/1 |
| 8,395,529 | B2 | 3/2013 | Seder et al. | |
| 9,946,262 | B2 | 4/2018 | Ansari | |
| 10,255,769 | B2 | 4/2019 | Sick et al. | |
| 10,257,646 | B2 | 4/2019 | Buchmann et al. | |
| 11,130,630 | B2 | 9/2021 | Paschall, II et al. | |
| 11,222,251 | B2 | 1/2022 | Simon et al. | |
| 12,168,598 | B2 * | 12/2024 | Weiss | B66F 9/0755 |
| 2008/0201044 | A1 * | 8/2008 | Yamada | B60K 28/04 701/50 |
| 2008/0262669 | A1 * | 10/2008 | Smid | G05D 1/0278 701/23 |
| 2009/0265059 | A1 * | 10/2009 | Medwin | B66F 9/24 701/50 |
| 2011/0093134 | A1 | 4/2011 | Emanuel et al. | |
| 2011/0234389 | A1 * | 9/2011 | Mellin | B66F 9/0755 340/435 |
| 2013/0093895 | A1 * | 4/2013 | Palmer | G08G 1/04 348/149 |
| 2013/0257607 | A1 * | 10/2013 | Rigby | B60Q 1/00 340/435 |
| 2014/0277691 | A1 | 9/2014 | Jacobus et al. | |
| 2016/0039340 | A1 * | 2/2016 | Schantz | B60Q 9/008 340/435 |
| 2016/0357187 | A1 | 12/2016 | Ansari | |
| 2016/0357262 | A1 | 12/2016 | Ansari | |
| 2017/0287335 | A1 | 10/2017 | Ansari | |
| 2017/0355377 | A1 | 12/2017 | Vijaya Kumar et al. | |
| 2017/0372563 | A1 | 12/2017 | Sick et al. | |
| 2017/0374511 | A1 | 12/2017 | Buchmann et al. | |
| 2019/0066406 | A1 * | 2/2019 | Sarwar | G07C 5/085 |
| 2019/0088132 | A1 | 3/2019 | Riggins et al. | |
| 2019/0096260 | A1 | 3/2019 | Ahn et al. | |
| 2019/0118801 | A1 | 4/2019 | Noh et al. | |
| 2019/0196480 | A1 * | 6/2019 | Taylor | G05D 1/0214 |
| 2019/0327124 | A1 * | 10/2019 | Lai | G01S 5/017 |
| 2020/0250502 | A1 | 8/2020 | Manci et al. | |
| 2020/0391795 | A1 | 12/2020 | Jeon | |
| 2021/0325892 | A1 | 10/2021 | Nister et al. | |
| 2021/0354729 | A1 | 11/2021 | Ng et al. | |
| 2021/0373575 | A1 | 12/2021 | Manjunath et al. | |
| 2022/0028271 | A1 | 1/2022 | Koravadi | |
| 2022/0043456 | A1 | 2/2022 | Shalev-Shwartz et al. | |
| 2022/0281728 | A1 * | 9/2022 | Weiss | B66F 9/07581 |
| 2022/0390955 | A1 * | 12/2022 | McLachlan | G05D 1/0223 |

* cited by examiner

VEHICLE-TO-VEHICLE COMMUNICATION FOR TRAJECTORY AWARENESS OF A MATERIAL HANDLING VEHICLE

CROSS-REFERENCE TO RELATED APPLICATIONS

This application is a continuation of U.S. patent application Ser. No. 17/831,223, titled Vehicle-to-Vehicle Communication for Trajectory Awareness of a Material Handling Vehicle and filed Jun. 2, 2022, which claims priority to U.S. Provisional Patent Application No. 63/196,526, titled Vehicle-to-Vehicle Communication for Trajectory Awareness of a Material Handling Vehicle and filed Jun. 3, 2021, the entirety of which are incorporated herein by reference.

STATEMENT REGARDING FEDERALLY SPONSORED RESEARCH

Not Applicable.

BACKGROUND

Warehouses typically employ the use of multiple material handling vehicles, specifically, operators may control travel of a material handling vehicle within the warehouse and navigate around obstacles, including other active material handling vehicles.

For certain types of vehicles that are manually operated, there are training requirements imposed by various government agencies, laws, rules and regulations. For example, the United States Department of Labor Occupational Safety and Health Administration (OSHA) imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment.

BRIEF SUMMARY

The present disclosure relates generally to vehicle awareness and, more specifically, to vehicle awareness systems and methods for use in conjunction with a material handling vehicle operated in a warehouse environment.

In one aspect, the present disclosure provides a system for vehicle-to-vehicle communication between a first material handling vehicle and a second material handling vehicle. The system includes a first material handling vehicle including a wireless transceiver configured to send and receive vehicle condition data, a speed sensor configured to detect a speed of the material handling vehicle, a steering angle sensor configured to detect a steering angle of a traction wheel, a position sensor configured to detect a position of the material handling vehicle, and a control unit in communication with the wireless transceiver, the speed sensor, the steering angle sensor, and the position sensor. The control unit is configured to receive a vehicle condition data, via the wireless transceiver, from a second material handling vehicle within a predetermined communication range of the wireless transceiver, calculate a first predicted vehicle position for the first material handling vehicle based on current vehicle condition data, calculate a second predicted vehicle position for the second material handling vehicle based on the received vehicle condition data, and determine if the first predicted vehicle position and the second predicted vehicle position overlap.

According to another aspect of the present disclosure, a method of controlling a material handling vehicle is provided. The method includes receiving vehicle condition data at a first material handling vehicle from a second material handling vehicle when the second material handling vehicle is within a predetermined communication range, determining a first predicted vehicle position for the first material handling vehicle based on current vehicle conditions, determining a second predicted vehicle position for the second material handling vehicle based on the received vehicle condition data, and determining if the first predicted vehicle position for the first material handling vehicle overlaps with the second predicted vehicle position for the second material handling vehicle. Upon the determination that the first predicted vehicle position overlaps with the second predicted vehicle position, the operator of the first material handling vehicle is provided an indication.

According to another aspect of the present disclosure, a system for assisting an operator of a material handling vehicle can include a first material handling vehicle. A transceiver can be configured to receive a condition data of a second material handling vehicle. A speed sensor can be configured to measure a speed of the first material handling vehicle. A steering angle sensor can be configured to measure a steering angle of the first material handling vehicle. The system can include an operator indicator. A control unit can be configured to calculate at least a first predicted path of the first material handling vehicle based at least in part on the speed of the first material handling vehicle received from the speed sensor and the steering angle of the first material handling vehicle received from the steering angle sensor. The control unit can receive, from the transceiver, the condition data. The control unit can calculate, using the condition data, a second predicted path of the second material handling vehicle. The control unit can determine if the first predicted path overlaps with the second predicted path. When the first predicted path overlaps with the second predicted path, the control unit can provide an indication to the operator.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
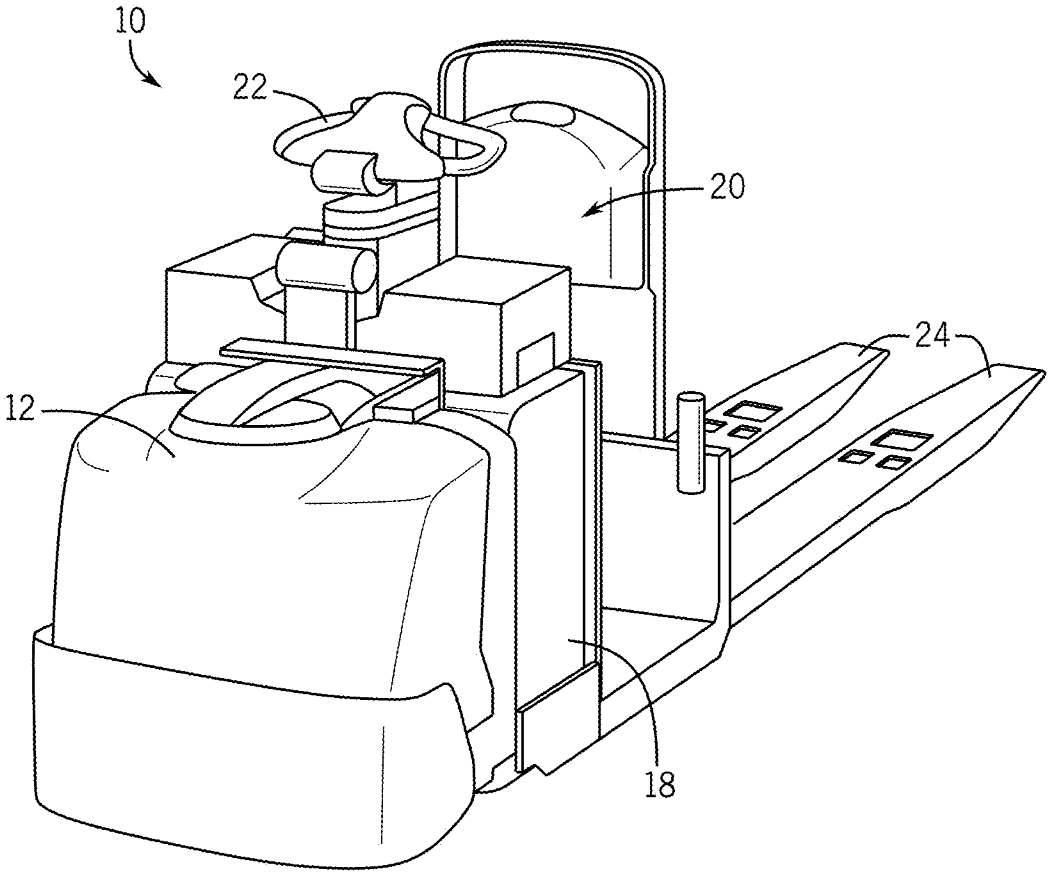
FIG. 1 is a front-left side perspective view of a material handling vehicle ("MHV") according to aspects of the present disclosure.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is also to be appreciated that material handling vehicles ("MHVs") are designed in a variety of classes and configurations to perform a variety of tasks. It will be apparent to those of skill in the art that the present disclosure is not limited to any specific MHV, and can also be provided with various other types of MHV classes and configurations, including for example, lift trucks, forklift trucks, reach trucks, SWING REACH® vehicles, turret trucks, side loader trucks, counterbalanced lift trucks, pallet stacker trucks, order pickers, transtackers, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles.

In a conventional warehouse environment, methods of maintaining awareness of other nearby MHVs and their trajectories rely primarily on operators of the MHVs visually observing other vehicles and mentally predicting the vehicle's trajectory or intentions. To augment vehicle awareness, the use of a horn, floor spotlight, or continuous hazard lights are used.

According to aspects of the present disclosure, MHVs (e.g., manually driven or automated MHVs) can communicate their current position, speed, and trajectory to other nearby MHVs via a wireless vehicle-to-vehicle communication method. This data communicates to other vehicles a predicted vehicle path that the MHV is currently occupying and/or including a load, or a predicted vehicle path that the MHV will soon be occupying in the immediate future. Nearby MHVs compare a predicted vehicle path that they plan to occupy based on their own position, speed, and trajectory with the predicted vehicle path claimed by all other MHVs within a predetermined communication range. If a vehicle calculates that its predicted vehicle path overlaps with the path already claimed (or predicted) by another MHV, a notification can be delivered to the operator of the MHV, or command the MHV to perform some other action, for example, to initiate slowing the MHV or denying a drive command given by the operator. In this way the operator is provided the ability to be made aware of other vehicles working nearby without direct line of sight to the other vehicles.

Figure 2:
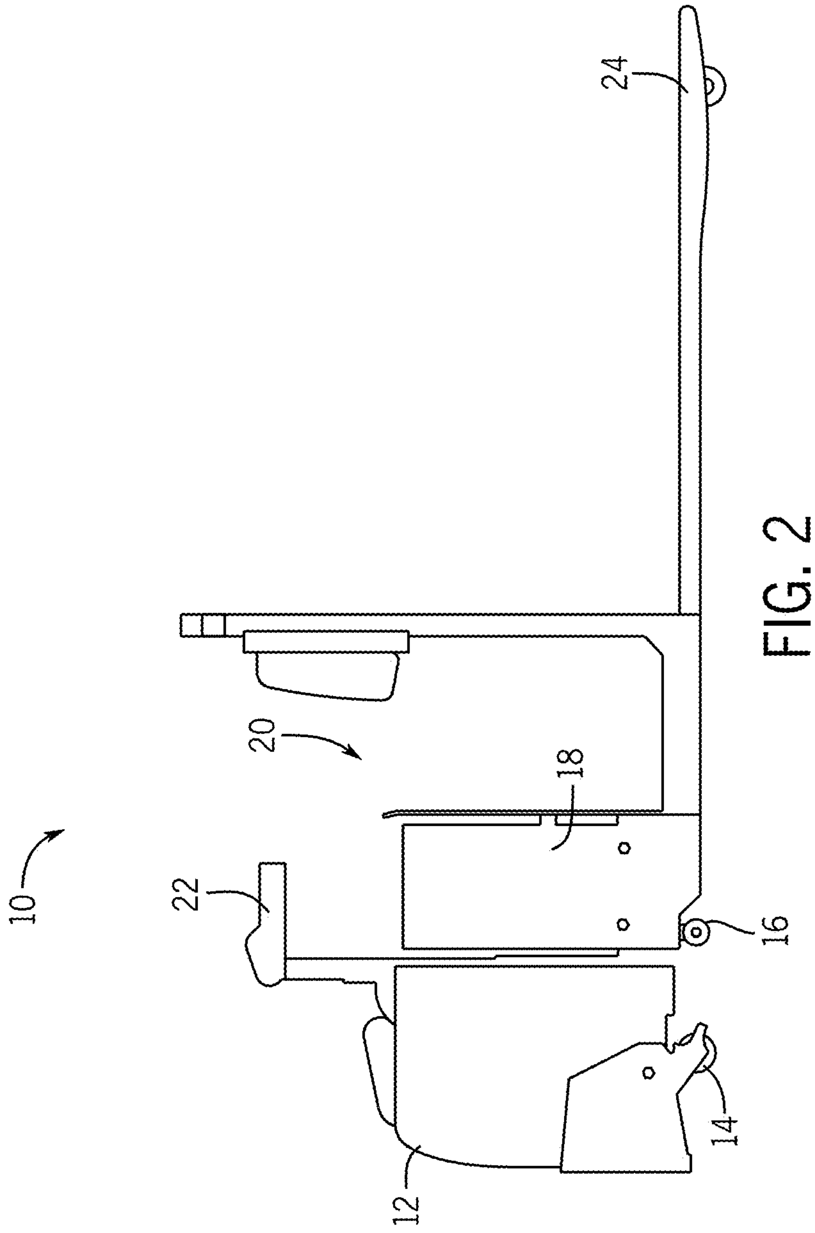
FIG. 2 is a plan view of the MHV of FIG. 1.

FIGS. 1 and 2 illustrate one non-limiting example of a material handling vehicle 10 according to the present disclosure. The material handling vehicle 10 may include a vehicle frame 12, a steerable traction wheel 14, a fixed axle 16, a power section 18, and an operator compartment 20. The power section 18 may be disposed within the vehicle frame 12 and may include a battery (or other power source) configured to supply power to various components of the material handling vehicle 10. For example, a battery may supply power to a motor (not shown) and/or transmission (not shown) disposed within the power section 18 and configured to drive the traction wheel 14. In the illustrated non-limiting example, the traction wheel 14 is arranged under the power section 18. In other non-limiting examples, the traction wheel 14 may be arranged in another location under the vehicle frame 12.

The operator compartment 20 may include a control handle 22 configured to provide a user interface for an operator and to allow the operator to control a speed and direction of travel of the material handling vehicle 10. In some non-limiting examples, the control handle 22 may be configured to manually steer and control power to the traction wheel 14. In the illustrated non-limiting example shown in FIGS. 1 and 2, the material handling vehicle 10 includes a pair of forks 24 configured to engage loads (e.g., a pallet). The forks 24 can be raised and lowered by an actuator (not shown) to lift/place loads. In some non-limiting examples, forks can be coupled to a mast and be raised or lowered via actuators in response to commands from a control handle.

The MHV 10 can be operated by an operator and can be capable of picking, placing, transporting, or otherwise manipulating a load, possibly including a pallet. In various examples, the operator controls the MHV 10 so that the forks 24 engage a pallet carrying a load. In so doing, the operator may extend or retract actuators (not shown) to pick, place, engage, or otherwise manipulate the load. Once the load is situated on the forks 24, the operator can move the load to another location as needed. In some non-limiting examples, a human operator may be replaced with an automated controller to comprise a fully automated system (i.e., an autonomously guided material handling vehicle).

Figure 3:
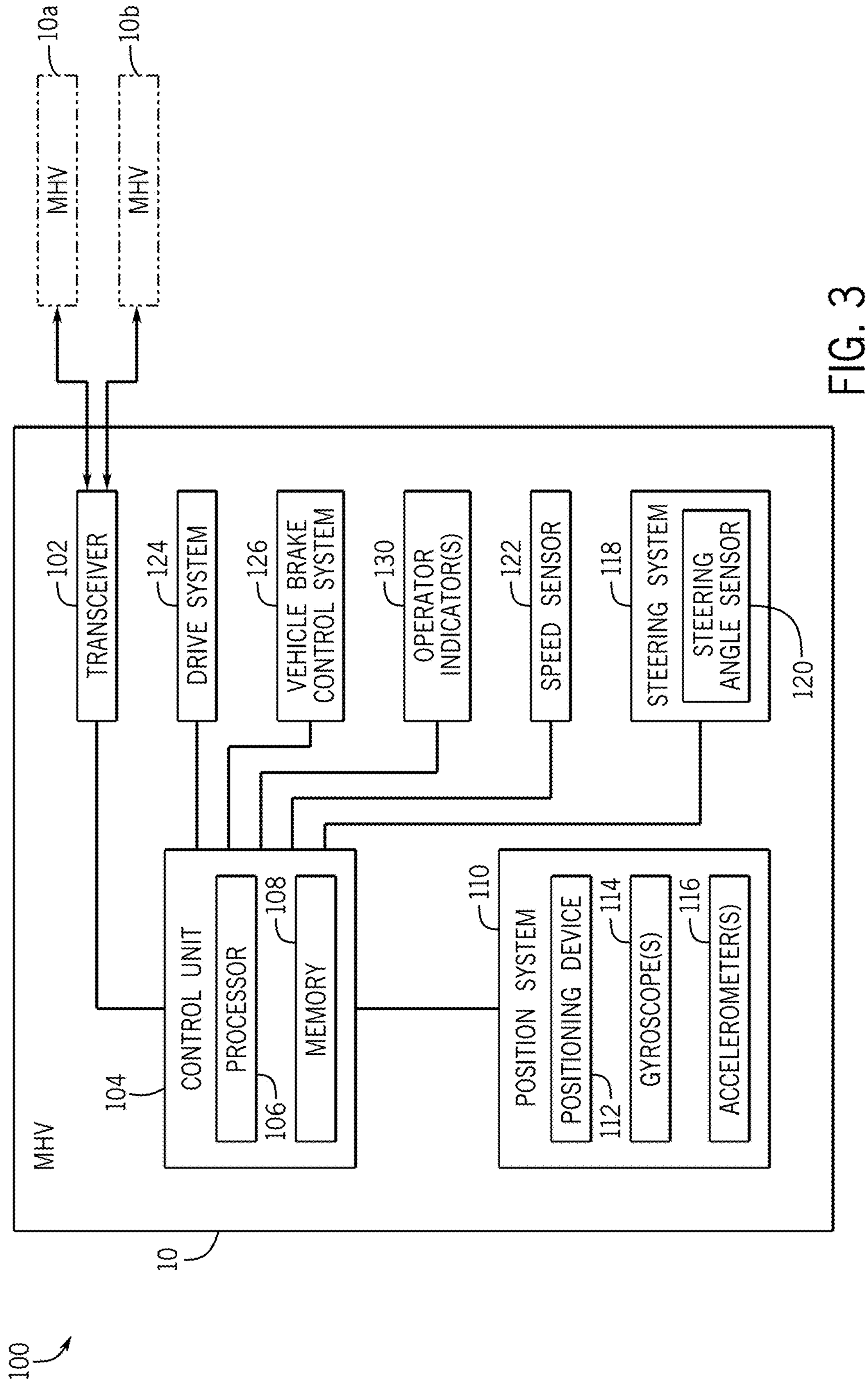
FIG. 3 is a block diagram of a MHV communication and control system according to aspects of the present disclosure.
Figure 4:
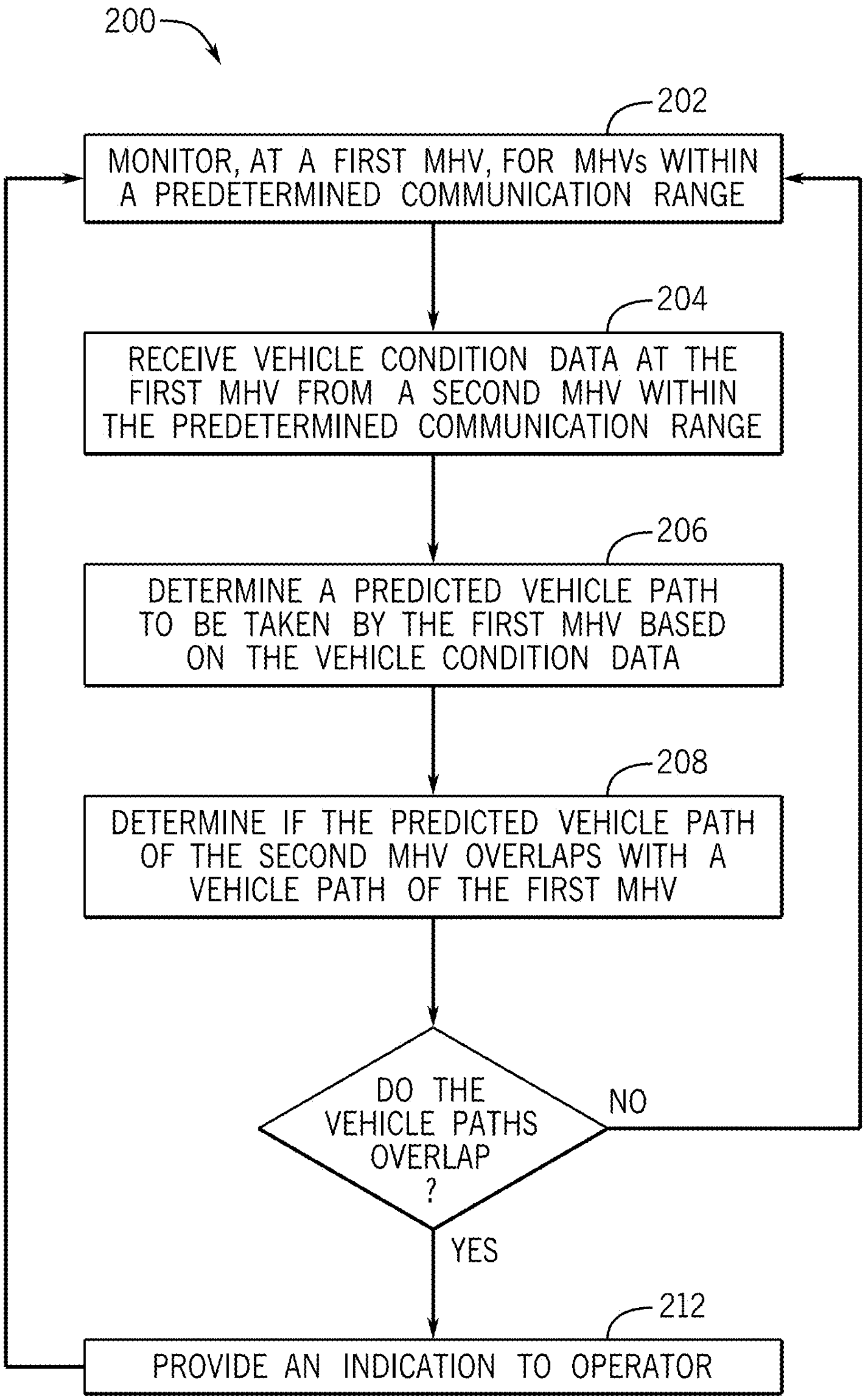
FIG. 4 is a block diagram illustrating a method of indicating an operator of nearby MHVs.

FIG. 3 illustrates a control system 100 for the MHV 10. As will be described, the control system 100 can communicate via wireless communication with one or more MHVs 10*a*, 10*b* through a transceiver 102. The communication may occur through one or more of any desired combination of wireless communication mechanisms and any desired network topology (or topologies when multiple communication mechanisms are utilized). Exemplary wireless communication networks include a 5G networks, a BLUETOOTH module, and/or a Wi-Fi transceiver, among others, including the Internet, cellular, satellite, microwave, and radio frequency, for providing data communication between MHVs 10, 10*a*, and 10*b*. It is to be understood that, while only one MHV control system is illustrated in detail in FIG. 3, each MHV (e.g., MHV 10*a*, 10*b*) would each include an identical control system. Further, although FIG. 4 illustrates two MHVs 10*a*, 10*b* in communication with MHV 10, it is to be understood that the MHV 10 can be in communication with a plurality of MHVs.

In the illustrated non-limiting example, the MHV 10 can include a control unit 104 in communication with the transceiver 102. The control unit 104 can include a processor 106 for processing and executing instructions stored in a memory 108. It should be appreciated that the control unit 104 may be a stand-alone dedicated controller or integrated within a larger control system within the MHV. It should also be appreciated that the control unit 104 can include more than one processor 106.

The MHV 10 also includes a positioning system 110 including a positioning device 112, such as a real time location system ("RTLS") and/or a global positioning system ("GPS"), in communication with the control unit 104. The positioning device 112 can be configured to detect a position or location of the MHV 10 within an operating environment (e.g., a warehouse, storage yard, etc.) and report that location to the control unit 104. For example, the positioning device 112 can provide the control unit 104 with a coordinate location for the MHV 10. The positioning system 110 can also include one or more gyroscopes 114, and/or one or more accelerometers 116 to measure the position, orientation, direction, speed, and acceleration of the MHV 10.

In the illustrated non-limiting example, the control unit 104 can be in communication with a variety of vehicle equipment. For example, the control unit 104 can be in communication with a steering system 118 of the MHV 10 to detect a position of the steerable traction wheel 14 and/or provide steering commands to the steerable traction wheel 14. For example, the steering system 118 can include a steering angle sensor 120 configured to detect a steering angle of the traction wheel 14 and/or steering angle input on the control handle 22. According to some non-limiting examples, the MHV 10 can be a four-wheeled vehicle including two steerable wheels. In this case, the steering angle can be determined as an average steer angle of the two steerable wheels.

According to some non-limiting examples, the control unit 104 can be in communication with a vehicle speed sensor 122 configured to detect a speed of the MHV 10. For example, the speed sensor 122 can be configured to detect a wheel speed of the MHV 10. The control unit 104 can be in communication with a drive system 124. The drive system 124 may provide a motive force for moving the MHV 10 in a designated travel direction, for example, by driving the traction wheel 14 of the MHV 10. The control unit 104 can receive drive commands via the drive system 124, for example, via an operator input to the control handle 22, and evaluate those drive commands in accordance with the methods described herein. The control unit 104 can also be in communication with a brake control system 126, which can include a brake configured to slow or stop the MHV 10. The control unit 104 can be configured to deliver a stop command to the vehicle brake control system 126 to stop the MHV 10 in response to an operator input to the control handle 22 or other form of vehicle brake control device.

According to the illustrated non-limiting example, the control unit 104 can be in communication with one or more operator indicators 130, which may prompt visual, auditory, and/or tactile indications if certain conditions are determined, as will be described herein. For example, one or more light sources on the MHV 10 or indications on a vehicle display can provide a visual indication. According to some non-limiting examples, a vehicle horn and/or a speaker may provide an audible indication. In other non-limiting examples, a tactile or haptic indication can be provided as a vibration to the operator through the control handle 22, or any other portion of the material handling vehicle 10 that can be in contact with the operator.

Figure 5:
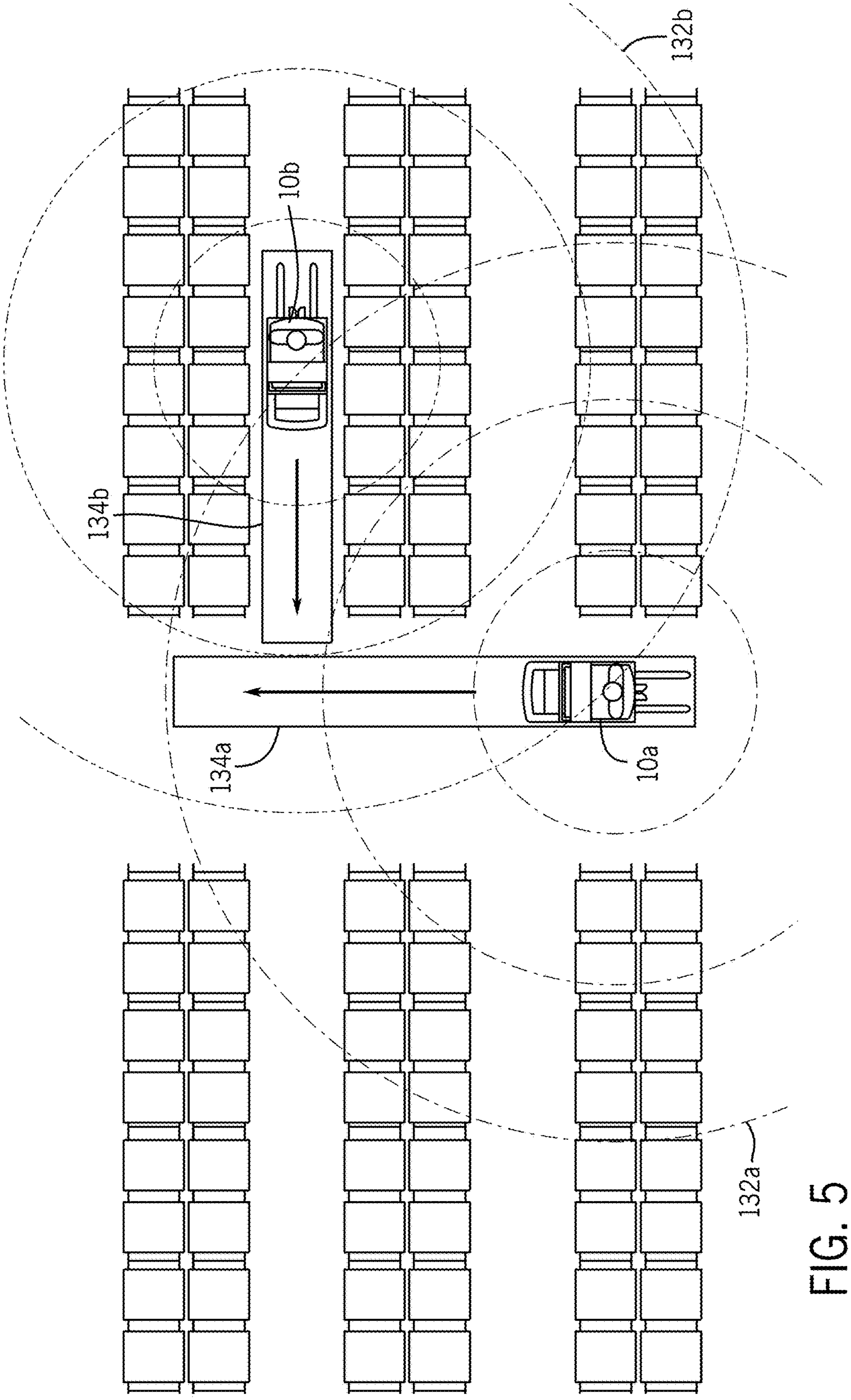
FIG. 5 illustrates vehicle-to-vehicle communication of predicted vehicle paths according to aspects of the present disclosure.
Figure 6:
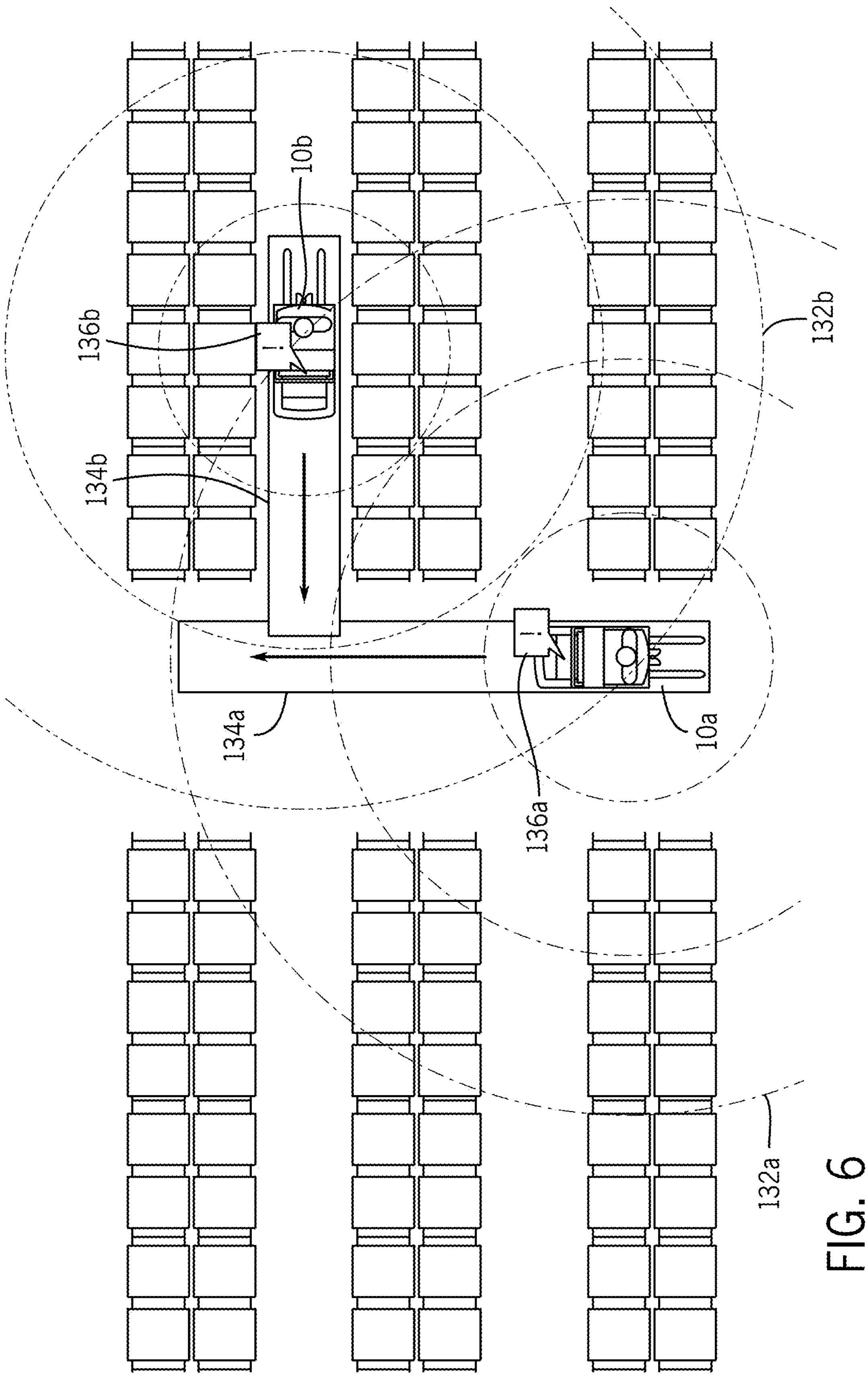
FIG. 6 illustrates overlapping predicted vehicle paths.

Referring now to FIGS. 4-6, a method 200 of augmenting vehicle awareness for an operator of an MHV is illustrated. The method 200 can begin at block 202, where a first MHV 10*a* (see, e.g., FIG. 5) can be continuously monitoring for MHVs nearby within a predetermined communication range 132*a* via the transceiver 102 arranged on the MHV 10*a* (see FIG. 3). Similarly, the first MHV 10*a* is within a predetermined communication range 132*b* of the second MHV 10*b*. According to some non-limiting examples, the predetermined communication range can be defined by a radius around the MHV that is at least twice the maximum stopping distance for the MHV. In the following description, the method 200 will be described from the perspective of the first MHV 10*a*.

While the first MHV 10*a* and the second MHV 10*b* are within communication range of each other, vehicle condition data can be sent and received by the transceiver 102 on the corresponding MHV 10*a*, 10*b*. At block 204, the first MHV 10*a* can receive the vehicle condition data from the second MHV 10*b* for processing and evaluation by the control unit 104 (see FIG. 3). The vehicle condition data for the second MHV 10*b* can include a pre-calculated predicted vehicle path for the second MHV 10*b* and/or a position (e.g., two-dimensional coordinates of the MHV within a warehouse, a GPS location, etc.), speed, and steering angle (e.g., from the speed sensor 122 and the steering angle sensor 120, respectively) for the second MHV 10*b*.

The first MHV 10*a*, via the control unit 104, can then calculate predicted positions or position information for the first and second MVHs 10*a*, 10*b*, based on the vehicle condition data of the first MHV 10*a* and the received vehicle condition data from the second MHV 10*b*. As shown in FIGS. 4-6, the predicted position information can be a first predicted vehicle path 134*a* for the first MHV 10*a* and a second predicted vehicle path 134*b* for the second MHV. For example, each MHV 10*a*, 10*b* can store (e.g., in the memory 108) a map or coordinate space of the operating environment. As illustrated in FIG. 5, a second MHV 10*b* is within the predetermined communication range 132*a* of the first MHV 10*a*. The first MHV 10*a* can update the map of the operating environment within the memory 108 with the calculated predicted vehicle paths for the first MHV 10*a* and the second MHV 10*b*. With the predicted vehicle paths 134*a*, 134*b* calculated, the first MHV 10*a* can determine if the predicted vehicle paths 134*a*, 134*b* overlap/intersect at block 208. For example, as illustrated in FIG. 5, the predicted vehicle paths 134*a*, 134*b* do not overlap. In this case, the first MHV 10*a* would return to block 202 and continue to monitor for MHVs within its predetermined communication range 132*a*.

Alternatively, as illustrated in FIG. 6, the predicted vehicle paths 134*a*, 134*b* overlap, and the method 200 illustrated in FIG. 4 can provide an indication to the operator at block 212. In this case, the first MHV 10*a* provides an indication 136*a* to the operator, for example, via the operator indicator 130 (see FIG. 3) indicating to the operator that the second MHV 10*b*, which may or may not be within a line of sight of the operator, is approaching to increase the awareness of the operator. It is to be understood that the second MHV 10*b* is also continuously executing the method 200, and likewise, would provide an indication 136*b* to the operator of the second MHV 10*b*.

Figure 7:
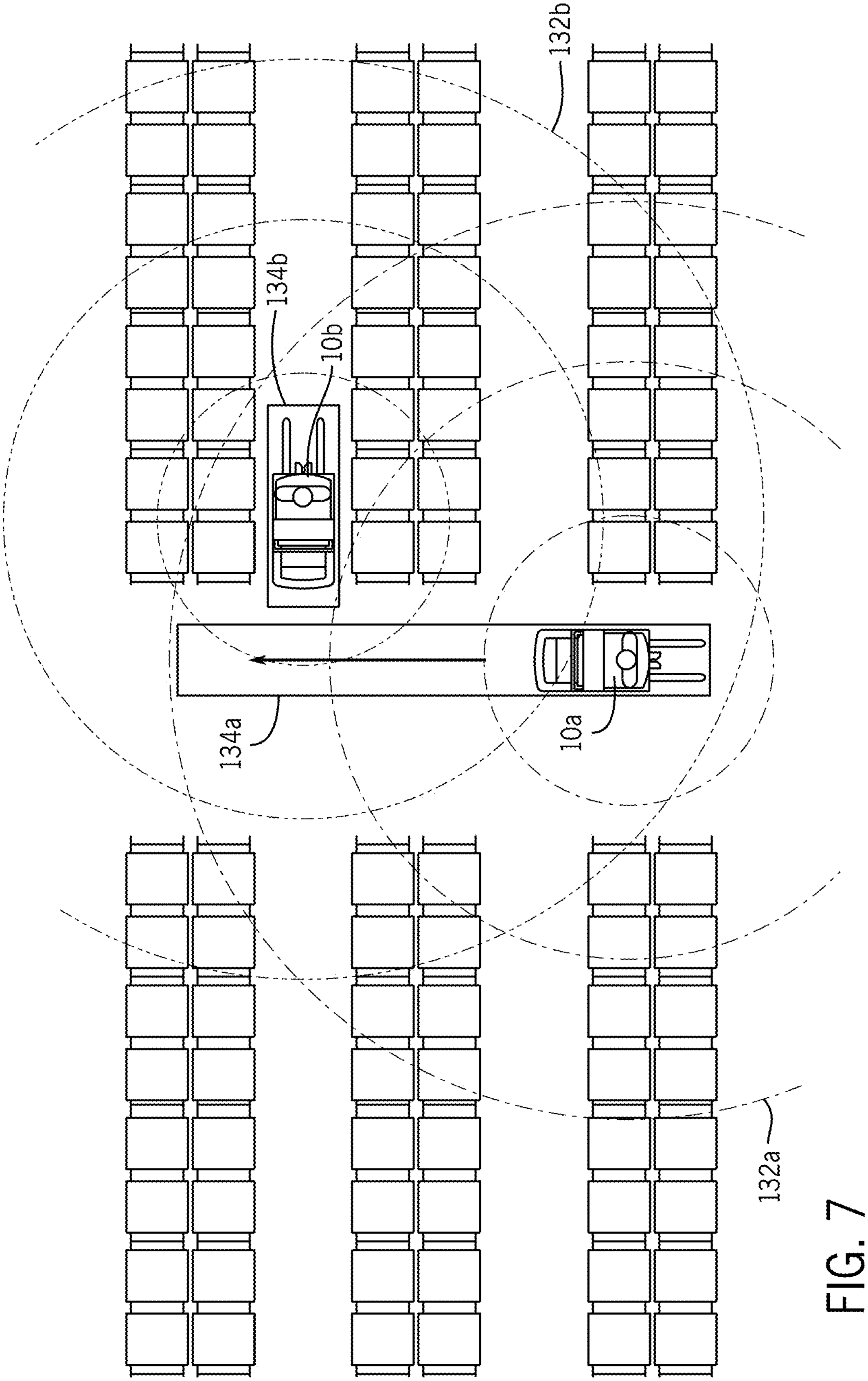
FIG. 7 illustrates predicted vehicle paths between a mobile and a stationary MHV.

According to another non-limiting example, the method 200 can be applied in situations where a drive command is being given by an operator of a MHV and the MHV can calculate a predicted vehicle path based on the received drive command and prior to the control unit 104 executing the received drive command. For example, as illustrated in FIG. 7, the first MHV 10*a* is traveling along while the second MHV 10*b* is stationary. As a result, the predicted vehicle path 134*a* of the first MHV 10*a* projecting forward from the first MHV 10*a* along the direction of travel is larger than the area occupied by the second MHV 10*b*. As illustrated, the stationary second MHV 10*b* is located at an end of an aisle, resulting in a predicted vehicle path 134*b* correlating to the area occupied by the MHV 10*b*.

Figure 8:
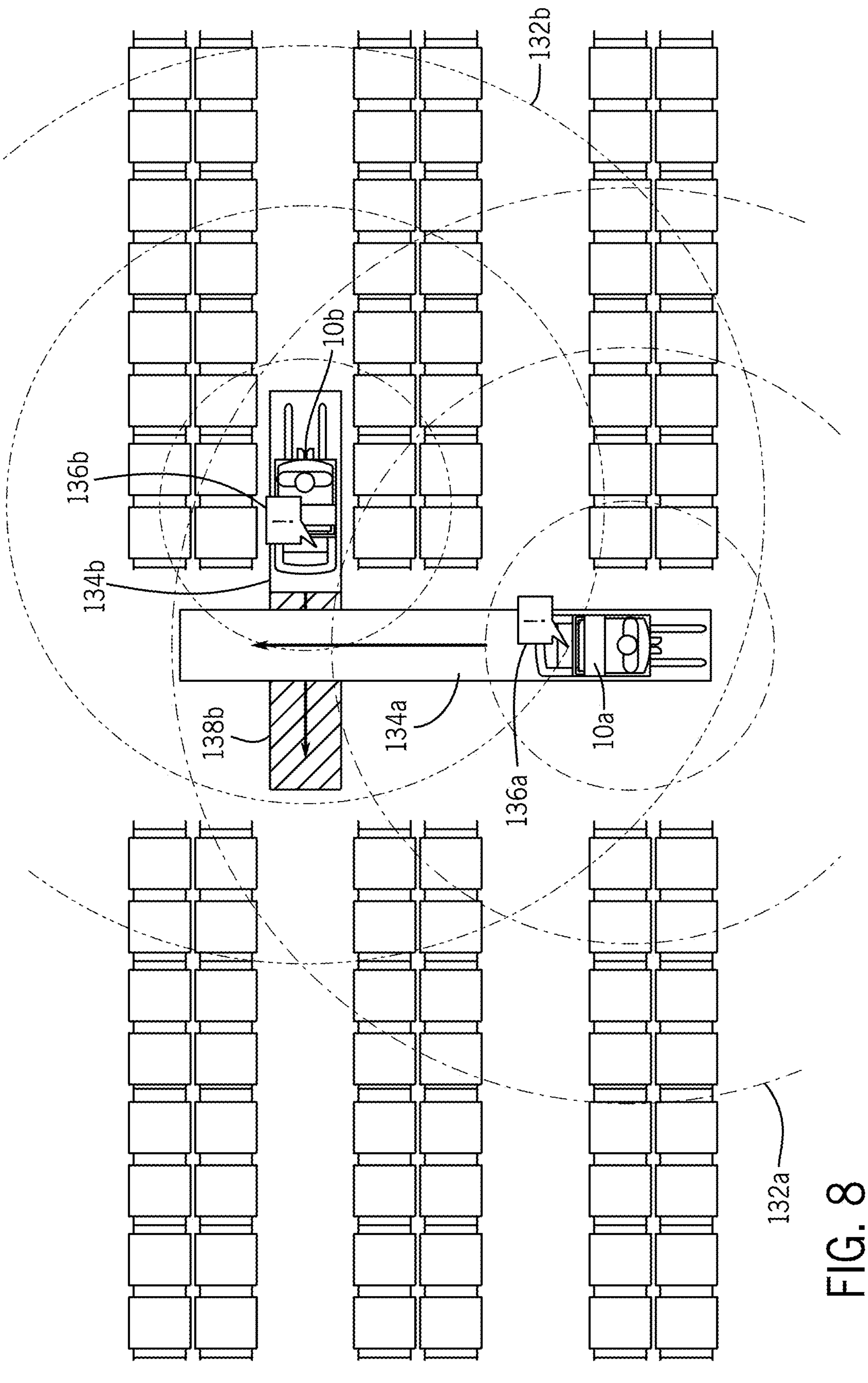
FIG. 8 illustrates overlapping predicted vehicle paths based on a drive command from the stationary MHV of FIG. 7.

As illustrated in FIG. 8, when the control unit 104 of the second MHV 10*b* receives a drive command from the operator (e.g., via the control handle 22 or other input device), the control unit 104 can calculate an estimated vehicle path 138*b* based on the driver command and execute the method 200 based on that estimated vehicle path 138*b*. That is, with the first MHV 10*a* and the second MHV 10*b* within communication range 132*a*, 132*b* of each other, vehicle condition data, including the estimated vehicle path 138*b*, can be sent and received therebetween. The second MHV 10*b* can receive vehicle condition data from the first MHV 10*a* for evaluation. The second MHV 10*b*, via the control unit 104, can then calculate a predicted vehicle path 134*a* for the first MHV 10*a* and compare that predicted vehicle path 134*a* with the estimated vehicle path 138*b*. With the vehicle paths calculated, the second MHV 10*b* can determine if the vehicle paths 134*a*, 138*b* overlap/intersect. For example, as illustrated in FIG. 8, the vehicle paths 134*a*, 138*b* overlap. In this case, the second MHV 10*b* provides an indication 136*b* to the operator, indicating to the operator that the first MHV 10*a* is approaching to increase the awareness of the operator. It is to be understood that the first MHV 10*a* can also receive the calculated estimated vehicle path 138*b* from the second MHV 10*b* and execute method 200 to provide an indication to the operator.

According to some non-limiting examples, the control unit 104 can intercept the drive command and determine to execute that command dependent upon the determination that the predicted or estimated vehicle paths overlap. For example, the control unit 104 can receive a drive command and, upon the determination that the estimated path 138*b* of the second MHV 10*b* overlaps with the predicted vehicle path 134*a* of the first MHV 10*a*, prevent the drive system 124 from executing the drive command. According to some non-limiting examples, the control unit 104 can be configured to activate the brake via the vehicle brake control system 126, or deactivate the drive system 124, upon the detection of overlapping predicted vehicle paths. In other non-limiting examples, the control unit 104 can alter the drive command to a different value. For example, travel of the MHV can be allowed in the specified direction at a reduced speed, for which the vehicle paths of the MHV and other MHVs in proximity do not overlap.

Referring now to FIGS. 9-15, a method of calculating a predicted vehicle path will be described. According to the illustrated non-limiting example, the predicted vehicle path can be a two-dimensional planar area including the footprint of the MHV 10, along with any loads received thereon, and an estimation of the area to be occupied by the MHV 10 in the immediate future based on the current vehicle conditions (e.g., position, speed, steering angle, etc.). For example, given a vehicle's geometry (footprint, wheelbase, position of steered tire, etc.) it is possible to calculate an estimated path the vehicle will travel (i.e., predicted vehicle path). Accounting for the speed and/or stopping distance of the MHV 10, given current vehicle conditions, the floor area the vehicle has a high probability of occupying in the immediate future can be calculated. In the following description, a two-dimensional example of calculating a predicted vehicle path is described, although it is to be understood that calculating a three-dimensional example is within the capability of those skilled in the art.

Figure 9:
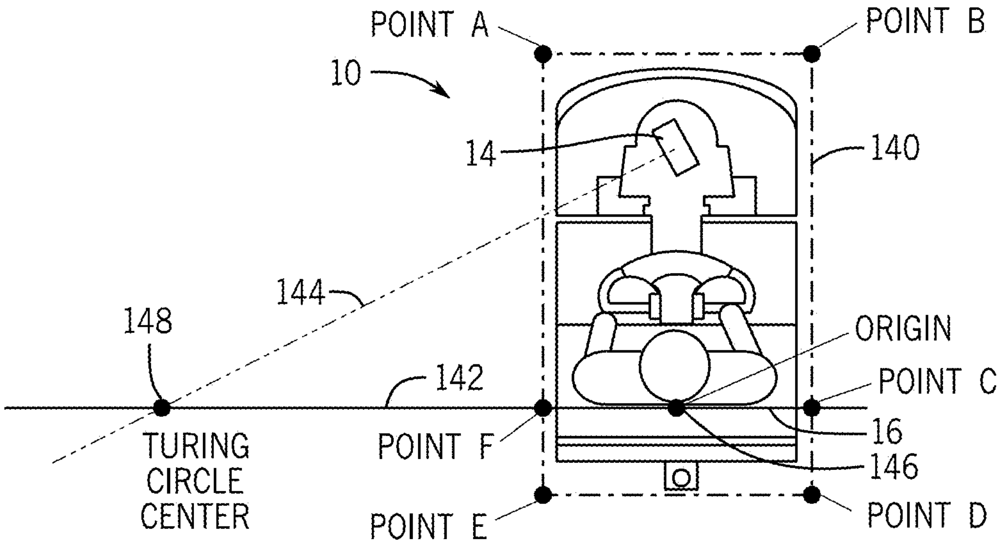
FIG. 9 illustrates a bounding box defined for an MHV according to aspects of the present disclosure.

Referring to FIG. 9, the geometry of the MHV 10 can be defined by a bounding box 140 surrounding the outer periphery of the MHV 10. In the illustrated non-limiting example, the bounding box 140 is defined by the rectangular area between point A at the front left of the MHV 10, point B at the front right of the MHV 10, point E at the rear left of the MHV 10, and point D at the rear right of the MHV 10. The MHV 10 can also define an axle axis 142 and a turning axis 144. The axle axis 142 can be defined by a line passing through the fixed axle 16 of the MHV 10 and the turning axis 144 can be defined by an axis passing through the center of the steerable traction wheel 14, orthogonal to the direction of the traction wheel 14. An origin 146 for the MHV 10, for the purposes of the calculation below, at the orthogonal projection of the center of the steerable traction wheel 14 onto the axle axis 142, defined along the fixed axle 16, with the steerable traction wheel in a neutral (e.g., straight) position. As the MHV 10 begins to steer, a turning center 148 can be defined as the intersection between the axle axis 142 and the turning axis 144.

Figure 10:
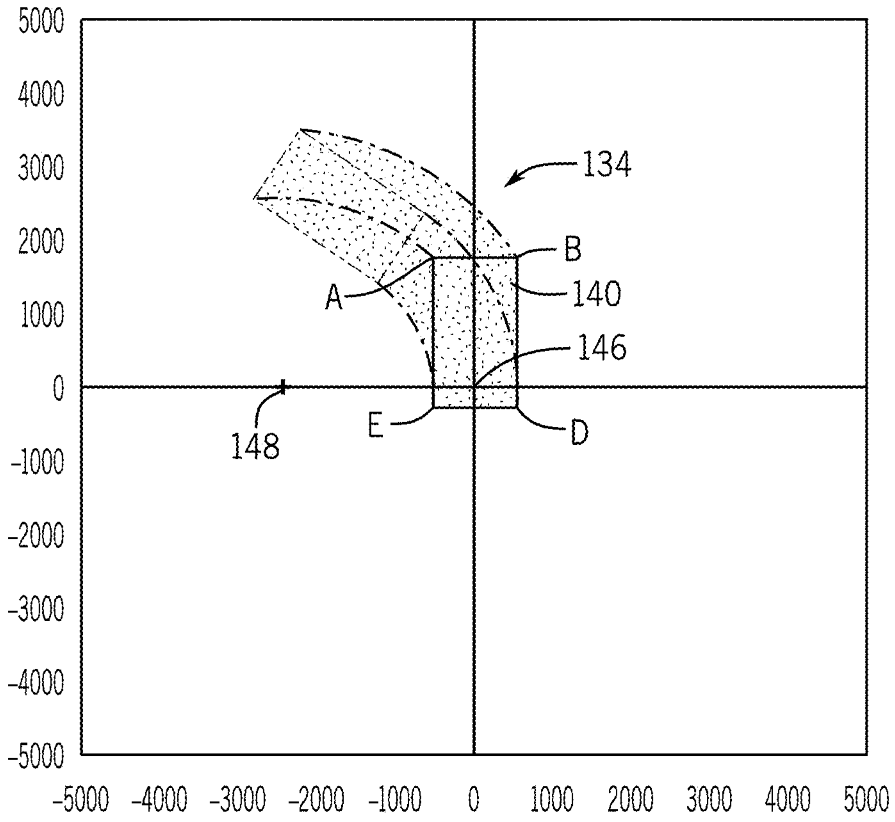
FIG. 10 illustrates a method of calculating a predicted vehicle path.
Figure 11:
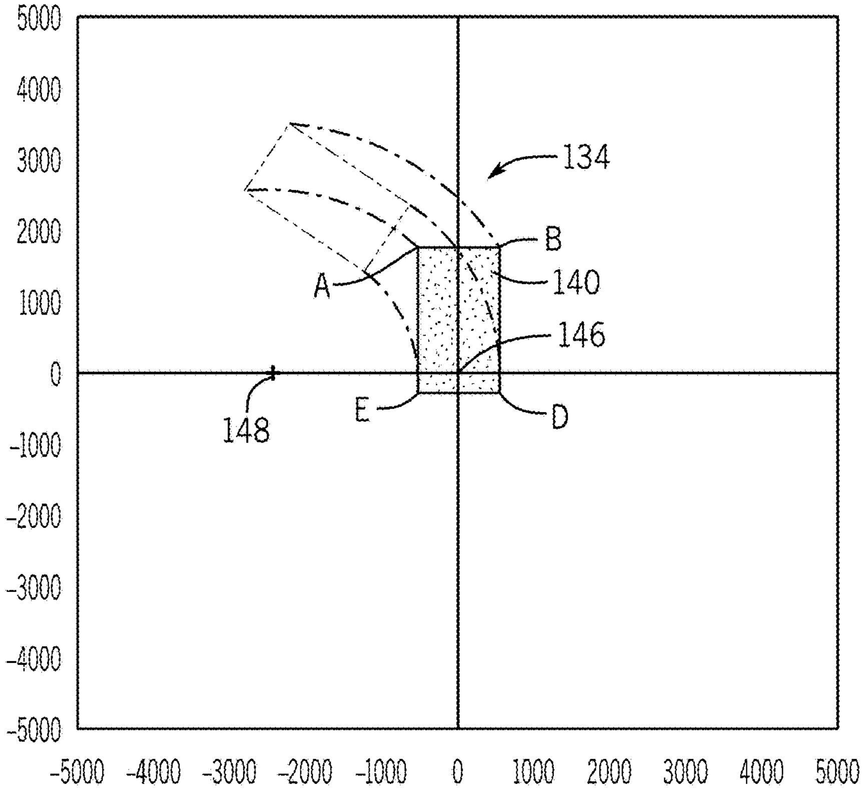
FIG. 11 illustrates a first area of the predicted vehicle path of FIG. 10.
Figure 12:
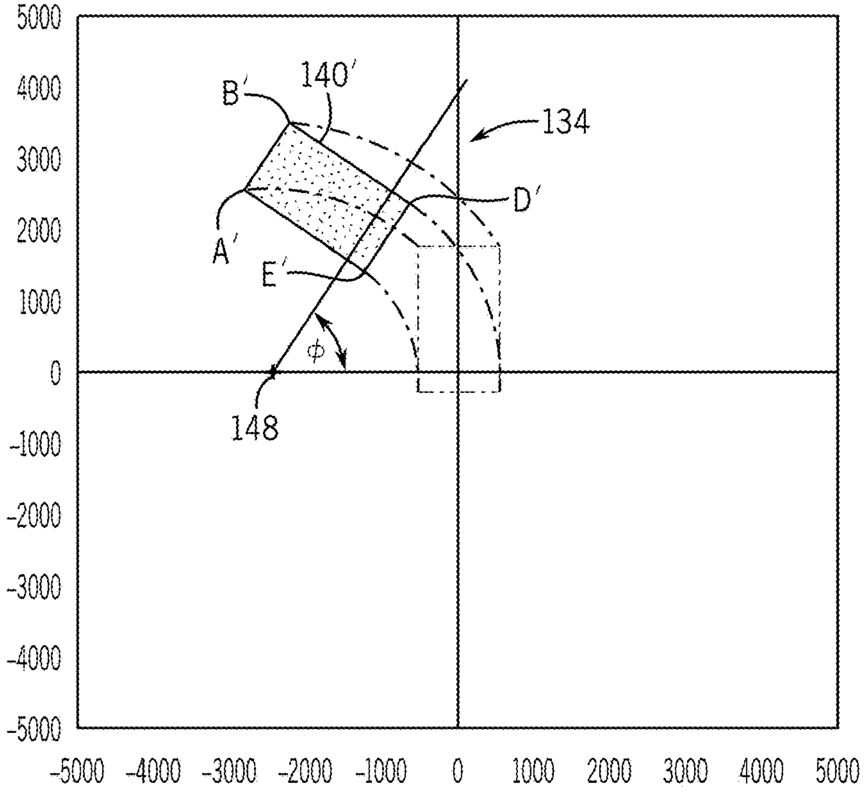
FIG. 12 illustrates a second area of the predicted vehicle path of FIG. 10.

A predicted vehicle path of a material handling vehicle can be a composite or combination of the areas of a bounding box of the MHV at a first location, a bounding box of the MHV at a predicted stopping location, and a plurality of annulus areas that extend therebetween. In this regard, FIG. 10 illustrates an exemplary predicted vehicle path 134 calculated for a MHV 10 executing a left turn. This area can be approximated by employing the following calculations. First, the bounding box 140 defined by the geometry of the MHV 10 can be calculated (FIG. 11) at a current position of the MHV 10. Then, a bounding box 140' at a predicted location of the MHV 10 can be calculated. According to one non-limiting example, the predicted location can be determined by the distance the MHV 10 will travel prior to being able to come to a stop based on the current vehicle conditions. The bounding box 140' can be calculated by revolving each of the points A, B, C, D of bounding box 140 about the turning center 148 by a revolving angle φ, resulting in the bounding box 140' defined by points A', B', C', D'. According to one non-limiting example, the revolving angle φ can be determined by setting the traction wheel 14 arc length equal to the stopping distance based on the current vehicle conditions.

Figure 13:
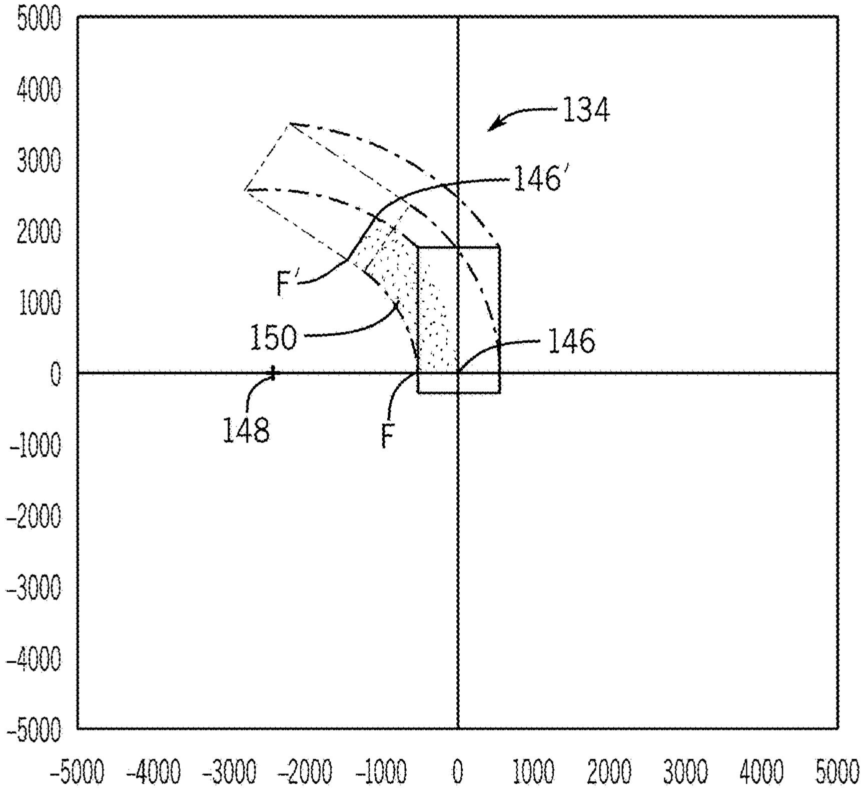
FIG. 13 illustrates a first annulus area of the predicted vehicle path of FIG. 10.
Figure 14:
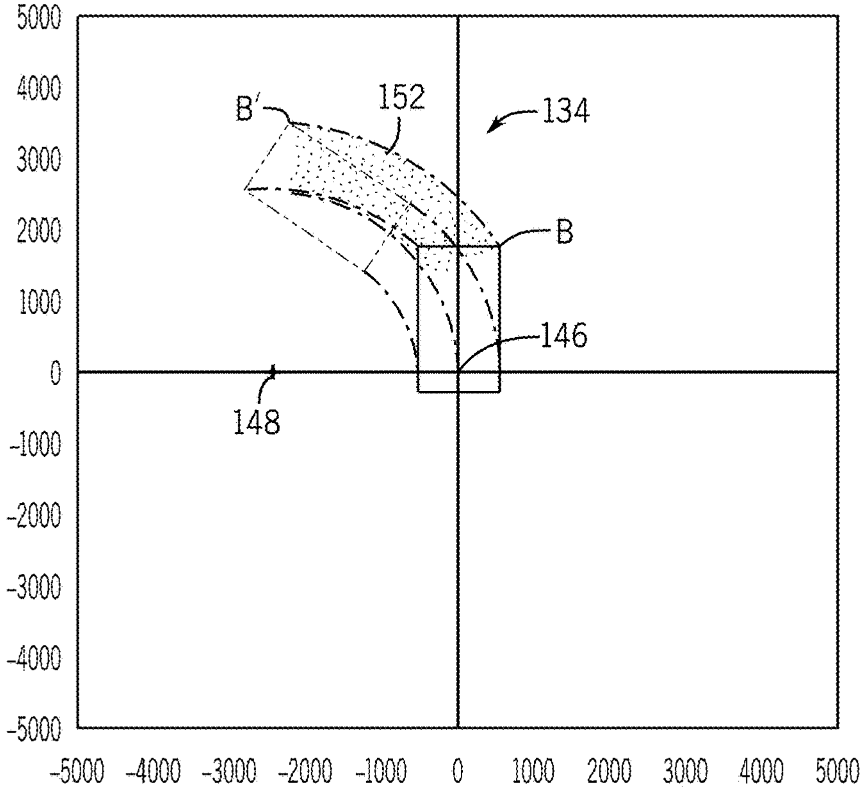
FIG. 14 illustrates a second annulus area of the predicted vehicle path of FIG. 10.
Figure 15:
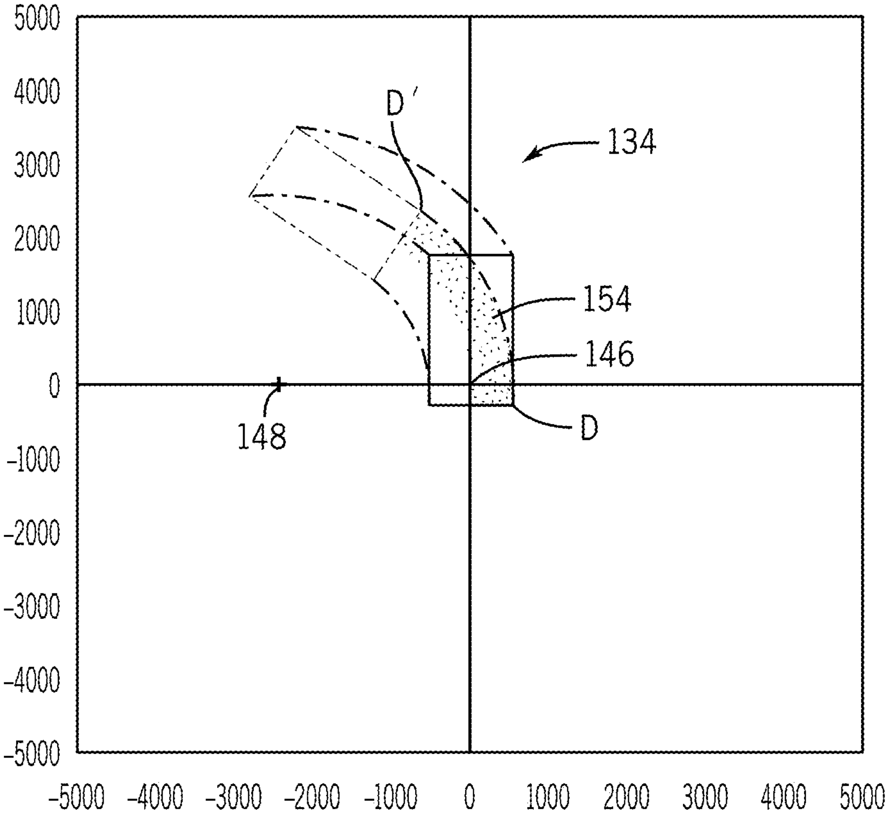
FIG. 15 illustrates a third annulus area of the predicted vehicle path of FIG. 10.
Figure 16:
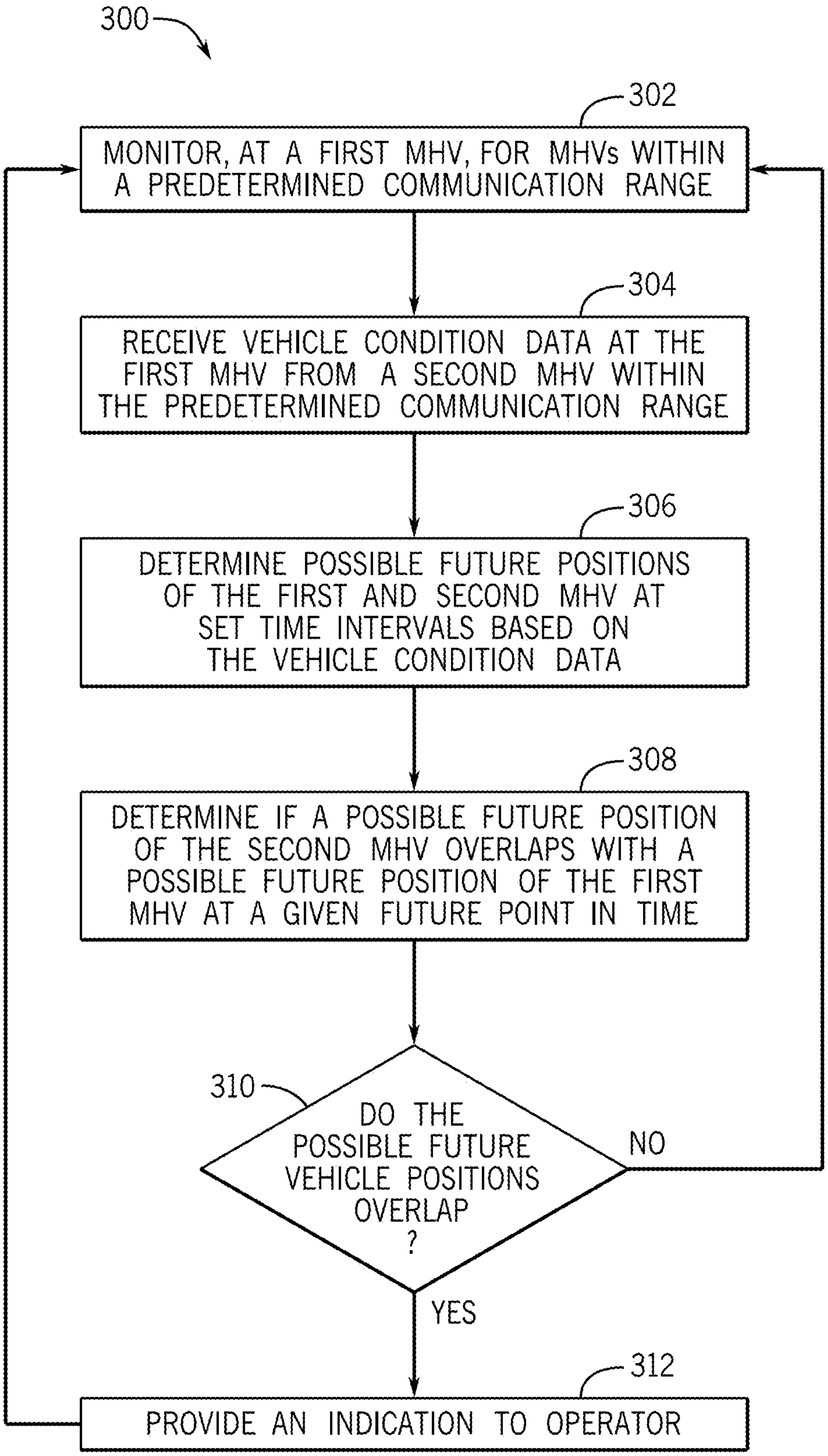
FIG. 16 is a block diagram illustrating a method of indicating an operator of nearby MHV, according to some embodiments.

Then, referring to FIGS. 13-15, a first, second, and third annulus areas can be calculated. The annulus areas are configured to account for the portions of the MHV 10 that turn at different radii depending on their location relative to the traction wheel 14. Referring specifically to FIG. 13, the first annulus area 150 can be defined by forming an annulus sector by sweeping about the turning center 148 by the revolving angle φ along an inner radius defined by the distance between the turning center 148 and point F (where the edge of the bounding box 140 intersects with the axle axis 144, see FIG. 9) and an outer radius defined by the distance between the turning center 148 and the origin 146. It is to be understood that, in the case of a right hand turn, point C would be utilized (see FIG. 9) instead of point F, and the turning center 148 would be arranged on the right hand side of the MHV 10.

Referring now to FIG. 14, the second annulus area 152 can be defined by forming an annulus sector by sweeping about the turning center 148 by the revolving angle φ along an inner radius defined by the distance between the turning center 148 and the origin 146 and an outer radius defined by the distance between the turning center 148 and point B. It is to be understood that, in the case of a right hand turn, point A would be utilized (see FIG. 9) instead of point B, and the turning center 148 would be arranged on the right hand side of the MHV 10.

Referring now to FIG. 15, the third annulus area 154 can be defined by forming an annulus sector by sweeping about the turning center 148 by the revolving angle φ along an inner radius defined by the distance between the turning center 148 and the origin 146 and an outer radius defined by the distance between the turning center 148 and point D. It is to be understood that, in the case of a right hand turn, point E would be utilized (see FIG. 9) instead of point D, and the turning center 148 would be arranged on the right hand side of the MHV 10.

Referring back to FIG. 9, the predicted vehicle path 134 can be defined by an overlay of the bounding box 140 for the MHV 10 at its current position, the bounding box 140' of the MHV 10 at its predicted location, and the first, second, and third annulus areas 150, 152, 154. According to some non-limiting examples, the predicted vehicle path 134 can be calculated in a first MHV and then delivered as an output to a second MHV. According to some non-limiting examples, the predicted vehicle path 134 can be calculated by a first MHV based on vehicle condition data delivered from a second MHV.

In other embodiments, as illustrated in FIGS. 16-21, an example method 300 of augmenting vehicle awareness for an operator of an MHV can be utilized. At block 302, as at block 202 of the method 200, the first MHV 10*a* can be continuously monitoring for MHVs nearby within a predetermined communication range 132*a* via the transceiver 102 arranged on the MHV 10*a* (see FIG. 3). At block 304, the first MHV 10*a* can receive the vehicle condition data from the second MHV 10*b* for processing and evaluation by the control unit 104 (see FIG. 3). Additionally or alternatively to the vehicle condition data described with respect to block 204 of the method 200, the vehicle condition data for the second MHV 10*b* can include a list of pre-calculated possible vehicle positions at set points in time in the future for the second MHV 10*b*, and/or maximum and minimum values for acceleration and steer angles. Alternatively, the material handling vehicle 10*a* could receive data about the dynamic conditions of vehicle 10*b* (e.g., current speed, dimensions, weight, steer angle, etc.), and could generate one or more precalculated possible vehicle positions of the second MHV 20*b*.

At block 306, the method 300 can determine possible future positions of the first MHV 10*a* and the second MHV 10*b* at set time points in time or time intervals, based on the vehicle condition data received at block 304. The possible future positions can include multiple possible positions for one or both of the MHVs 10*a*, 10*b* for different dynamic conditions of the respective MHV (e.g., steer angle changes, acceleration, deceleration).

Figure 17:
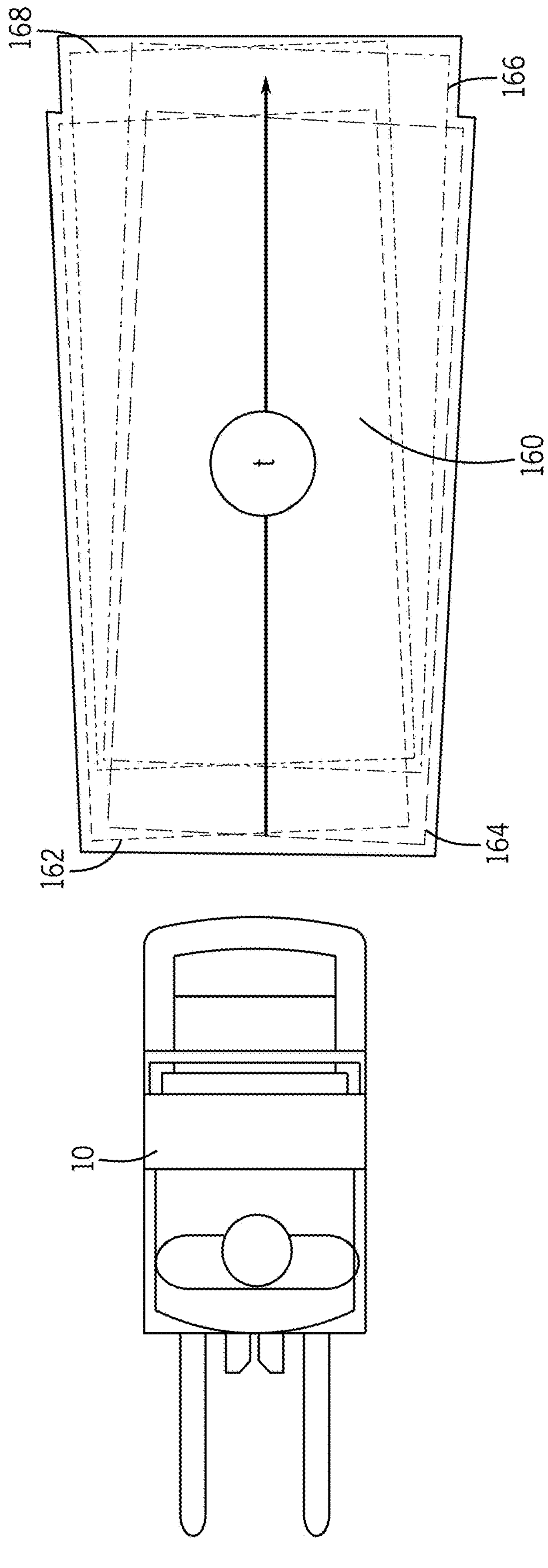
FIG. 17 illustrates an envelope for possible future positions of a material handling vehicle at time t.

Referring now to FIG. 17, an envelope 160 for future possible vehicle positions is shown at a time t for MHV 10. The envelope 160 can define an area which can include an overlay of a plurality of possible positions for the MHV 10 at time t, assuming different dynamic conditions. For example, the envelope 160 can include an area for a first possible position 162 of the MHV 10, which as illustrated is the position the MHV 10 would occupy at time t if travelling at a maximum leftward steering angle, and a maximum deceleration. The envelope could also include an area for a second possible position 164 of the MHV, which is the position MHV would occupy at time t if travelling at a maximum rightward steering angle and a maximum deceleration for time t. The envelope could further include a third possible position 166 which assumes a maximum acceleration and maximum rightward steering angle at time t, and a fourth possible position 168 which assumes a maximum acceleration and maximum leftward steering angle of the MHV at time t. In other non-limiting examples, the envelope can also include possible positions for the MHV when travelling at other steering angles or accelerations, including a possible position for the MHV 10 when travelling at a maximum acceleration with a 0 degree steering angle, and/or a possible position for the MHV 10 when travelling at a maximum deceleration at a 0 degree steering angle. Thus, for a given future point in time, and envelope 160 can include or encompass all possible positions for the MHV at the given time, or a subset of possible positions, given different dynamic conditions. A plurality of envelopes 160 can be calculated for each MHV 10, 10*a*, 10*b*, for a plurality of corresponding points in time. In some non-limiting examples, an envelope for a future possible position can be calculated for every 0.5 seconds up to 10 seconds (e.g., a future position can be calculated at 0.5 s, 1 s, 1.5 s, 2 s, etc.). In some embodiments, future positions can be calculated at about 0.1 second intervals, or 0.25 second intervals, or 1 second intervals. In some embodiments, a stopping time can be calculated, based on the time it would require for an MHV to come to a full stop at a maximum deceleration, and this stopping time can define an ultimate time for which a possible future position is calculated. For example, if a stopping time for a material handling vehicle is 10 seconds, the future positions of the material handling vehicle can be calculated up to 10 seconds. In some embodiments, the maximum time for which a future position is calculated can be a setting that is set by a user of the material handling vehicle.

It is to be understood that calculating an envelope for future possible positions can take into account a current position, velocity, trajectory, steering angle, or acceleration of the material handling vehicle. Additionally, the possible future positions, and envelopes containing these possible future positions can be predicted based on a drive command from the operator of the MHV, as discussed, for example, with respect to FIGS. 7 and 8.

Figure 18:
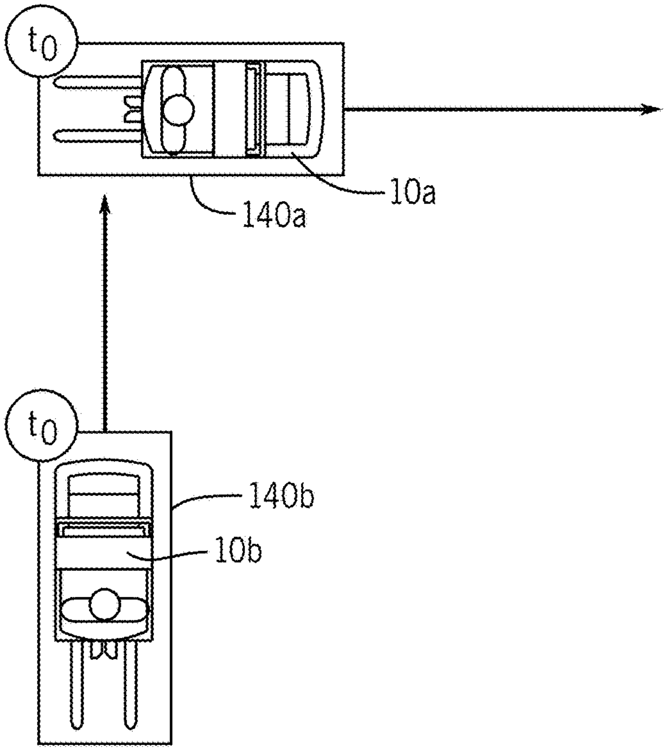
FIG. 18 illustrates initial positions for two MHVs.
Figure 19:
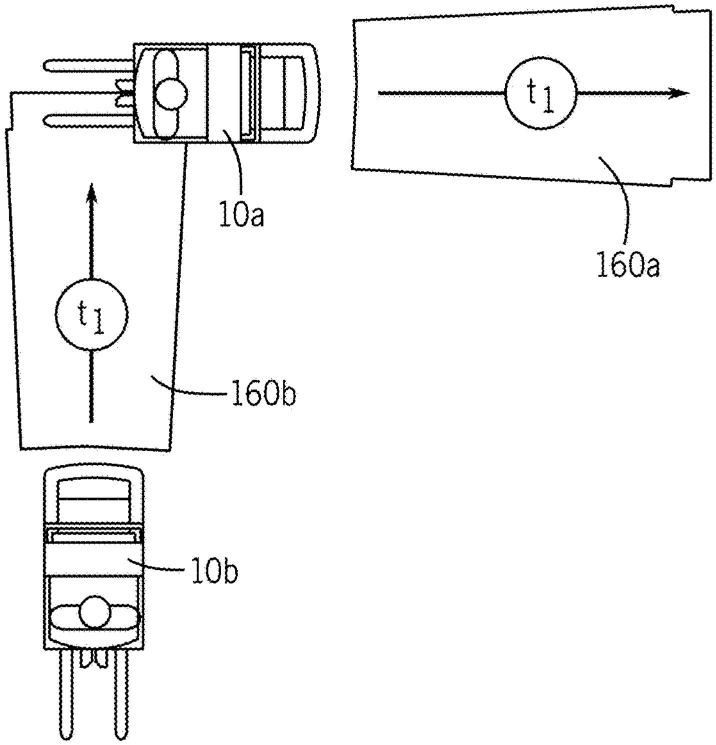
FIGS. 19 and 20 illustrate envelopes for two MHVs showing possible positions of the vehicles at given times in the future.
Figure 20:
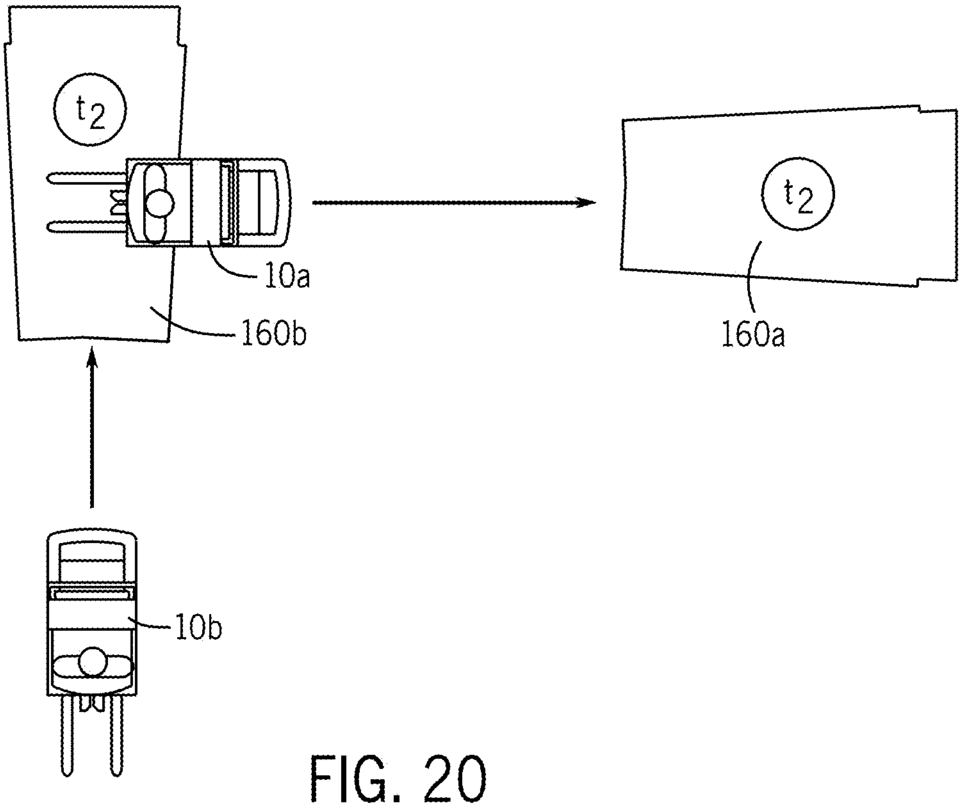

Referring back to FIG. 16, at block 308, the example method 300 can include a determination of whether a possible future position of the second MHV 10*b* at a given time overlaps with a corresponding possible future position of the first MHV 10*a* at the same point in time. In this regard, FIGS. 18-20 illustrate a non-limiting example showing initial positions 140*a*, 140*b*, and calculation of envelopes 160*a*, 160*b* for the first MHV 10*a* and the second MHV 10*b*. As shown in the non-limiting example in FIG. 18, at an initial time to, the first MHV 10*a* is travelling rightward and the second MHV 10*b* is traveling in a direction towards the initial position 140*a* of MHV 10*a* (e.g., MHV 10*a* is in a path of travel of MHV 10*b*). A calculation is performed at FIG. 19 for envelopes 160*a*, 160*b* of future possible positions of MHVs 10*a* and 10*b* at time $t_1$. It is to be understood that either or both of the MHVs 10*a*, 10*b* can perform this calculation based on the condition data received. As shown, the envelope 160*b* for a possible future position of the second MHV 10*b* at time $t_1$ overlaps with the first MHV 10*a* at the first MHV 10*a* initial position (e.g., initial position 140*a*). However, because the envelope 160*b* does not overlap with envelope 160*a* at time $t_1$, no indication is provided to the operator at step 312, as the possible future positions of the MHVs 10*a*, 10*b* at time $t_1$ do not intersect or overlap. FIG. 20 illustrate envelopes 160*a*, 160*b* for future possible positions of MHVs 10*a*, 10*b* respectively at time $t_2$. The method 300 can determine if the envelopes 160*a*, 160*b* intersect at $t_2$ simultaneously to making that determination for $t_1$, and thus the method could not only identify a potential overlap or intersection, but also a potential timing of the intersection, and could provide that additional information to the operator or to the control unit 104 to take an appropriate action in response thereto. As shown, the future possible positions represented by envelopes 160*a*, 160*b* at $t_2$ do not overlap, and therefore, no indication is provided to the operator at step 312.

Figure 21:
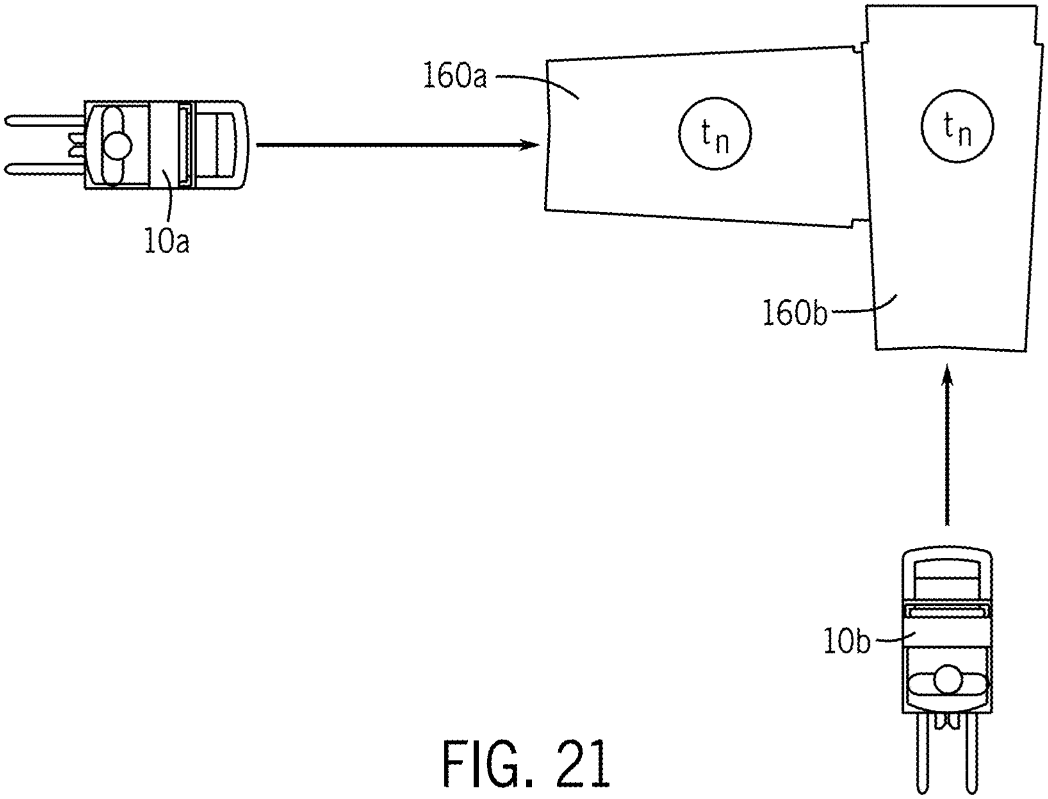
FIG. 21 illustrates overlapping envelopes for MHVs at a time $t_n$ showing a possible overlap in the vehicles' positions at time $t_n$.

FIG. 21 illustrates another non-limiting example showing the operation of method 300 for MHVs 10*a*, 10*b*. In the illustrated example, an envelope 160*a* is calculated for possible future positions of MHV 10*a* at time $t_n$, and an envelope 160*b* is calculated for possible future positions of MHV 10*b* at time $t_n$. As shown, the envelopes 160*a*, 160*b* overlap, and therefore at step 312 (see FIG. 16), an indicator can be provided to the operator of either or both of MHVs 10*a*, 10*b*.

The present disclosure provides distinct advantages, such as the ability to provide an indication to operators that other MHVs are nearby, without the need for line of sight, increasing the vehicle awareness of the operator. Further, the systems and methods described herein can selectively notifying operators when the predicted vehicle path of their MHV overlap with that of another MHV's predicted vehicle path. In addition, the present disclosure provides systems and methods for evaluating an operator's drive commands, and evaluate that command based on environmental conditions, such as the vehicle conditions of nearby MHVs, before executing the drive command.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A system for vehicle-to-vehicle communication between a first material handling vehicle and a second material handling vehicle, the system comprising:

- a first material handling vehicle including a wireless transceiver configured to send and receive vehicle condition data, and a control unit in communication with the wireless transceiver, the control unit configured to:
  - receive a vehicle condition data, via the wireless transceiver, from a second material handling vehicle within a predetermined communication range of the wireless transceiver;
  - calculate a first predicted vehicle position for the first material handling vehicle based on current vehicle condition data, the first predicted vehicle position comprising a two-dimensional planar area including a plurality of possible positions of the first vehicle at a first time;
  - calculate a second predicted vehicle position for the second material handling vehicle based on the received vehicle condition data, the second predicted vehicle position comprising a two-dimensional planar area including a plurality of possible positions of the second vehicle at the first time; and determine if the first predicted vehicle position and the second predicted vehicle position overlap, upon the determination of an overlap between the first predicted vehicle position and the second predicted vehicle position, activate an operator indicator.

2. The system of claim 1, wherein the first predicted vehicle position includes a first path of the first material handling vehicle, and the second predicted vehicle position includes a second path of the second material handling vehicle.

3. The system of claim 2, wherein the first path is calculated based on a first stopping distance of the first material handling vehicle, and the second path is calculated based on a second stopping distance of the second material handling vehicle.

4. The system of claim 2, wherein the first path is calculated based at least in part on a drive command received by the control unit.

5. The system of claim 2, wherein the first path is calculated based at least in part on a trajectory of the first material handling vehicle, the trajectory including a current speed of the first material handling vehicle.

6. The system of claim 1, wherein the first predicted vehicle position is one of a first plurality of predicted positions of the material handling vehicle, each predicted position of the first plurality of predicted positions corresponding to one of a plurality of points in time, and wherein the second predicted vehicle position is one of a second plurality of predicted positions of the material handling vehicle, each predicted position of the second plurality of predicted positions corresponding to one of the plurality of points in time.

7. The system of claim 1, wherein the vehicle condition data includes a position, speed, and steering angle of the second material handling vehicle.

8. The system of claim 1, wherein at least one position of the plurality of possible positions is a position of the material handling vehicle when the first material handling vehicle is travelling at least one of a maximum acceleration and a maximum steering angle.

9. A system for vehicle-to-vehicle communication between a first material handling vehicle and a second material handling vehicle, the system comprising:

a first material handling vehicle including a wireless transceiver configured to send and receive vehicle condition data, a position sensor configured to detect a position of the first material handling vehicle, and a control unit in communication with the wireless transceiver and the position sensor, the control unit configured to:

receive a vehicle condition data, via the wireless transceiver, from a second material handling vehicle within a predetermined communication range of the wireless transceiver;

calculate a first predicted vehicle position for the first material handling vehicle based on current vehicle condition data, the first predicted vehicle position comprising a two-dimensional planar area including a plurality of possible positions of the first vehicle at a first time;

calculate a second predicted vehicle position for the second material handling vehicle based on the received vehicle condition data, the second predicted vehicle position comprising a two-dimensional planar area including a plurality of possible positions of the second vehicle at the first time; and determine if the first predicted vehicle position and the second predicted vehicle position overlap, upon the determination of an overlap between the first predicted vehicle position and the second predicted vehicle position, activate an operator indicator.

10. The system of claim 9, wherein the vehicle condition data includes the detected position of the first material handling vehicle.

11. The system of claim 9, wherein the position sensor is a sensor integrated with a real time location system.

12. The system of claim 9, wherein the position sensor is a global positioning system sensor.

13. The system of claim 9, wherein the first predicted vehicle position includes a first path of the first material handling vehicle, and the second predicted vehicle position includes a second path of the second material handling vehicle.

14. The system of claim 13, wherein the first path is calculated based on a first stopping distance of the first material handling vehicle, and the second path is calculated based on a second stopping distance of the second material handling vehicle.

15. The system of claim 13, wherein the first path is calculated based at least in part on a drive command received by the control unit.

16. The system of claim 13, wherein the first path is calculated based at least in part on a trajectory of the first material handling vehicle, the trajectory including a current speed of the first material handling vehicle.

17. The system of claim 9, wherein the first predicted vehicle position is one of a first plurality of predicted positions of the material handling vehicle, each predicted position of the first plurality of predicted positions corresponding to one of a plurality of points in time, and wherein the second predicted vehicle position is one of a second plurality of predicted positions of the material handling vehicle, each predicted position of the second plurality of predicted positions corresponding to one of the plurality of points in time.

18. The system of claim 9, wherein the vehicle condition data includes a speed and steering angle of the second material handling vehicle.

19. The system of claim 9, wherein at least one position of the plurality of possible positions is a position of the material handling vehicle when the first material handling vehicle is travelling at least one of a maximum acceleration and a maximum steering angle.

20. A system for vehicle-to-vehicle communication between a first material handling vehicle and a second material handling vehicle, the system comprising:

a first material handling vehicle including a wireless transceiver configured to send and receive vehicle condition data, and a control unit in communication with the wireless transceiver, the control unit configured to:

receive a vehicle condition data, via the wireless transceiver, from a second material handling vehicle within a predetermined communication range of the wireless transceiver;

calculate a first predicted vehicle position for the first material handling vehicle based on current vehicle condition data, the first predicted vehicle position defined by a first envelope, the first envelope including a plurality of possible future positions of the first material handling vehicle at a first time, each of the plurality of possible future positions being associated with a corresponding dynamic condition of the first material handling vehicle;

calculate a second predicted vehicle position for the second material handling vehicle the second predicted vehicle position defined by a second envelope, the second envelope including a plurality of possible future positions of the second material handling vehicle at the first time, each of the plurality of possible future positions being associated with a corresponding dynamic condition of the second material handling vehicle; and determine if the first predicted vehicle position and the second predicted vehicle position overlap, upon the determination of an overlap between the first predicted vehicle position and the second predicted vehicle position, activate an operator indicator.

* * * * *